United States Patent [19]

Widerström

[11] Patent Number: 4,787,536
[45] Date of Patent: Nov. 29, 1988

[54] DOSAGE PACKAGE

[75] Inventor: Carin A. M. Widerström, Höllviksnäs, Sweden

[73] Assignee: Aktiebolaget Draco, Lund, Sweden

[21] Appl. No.: 834,229

[22] Filed: Feb. 27, 1986

[30] Foreign Application Priority Data

Mar. 29, 1985 [SE] Sweden .................. 8501582

[51] Int. Cl.⁴ .............................. B65D 37/00
[52] U.S. Cl. .................. 222/212; 222/541; 206/532
[58] Field of Search ............ 222/107, 206, 212, 215, 222/541, 544, 1; 206/277, 484, 528, 530-532

[56] References Cited

U.S. PATENT DOCUMENTS

| | | | |
|---|---|---|---|
| 630,277 | 8/1899 | Weitling | 222/212 X |
| 1,104,607 | 7/1914 | Berger | 222/212 X |
| 2,432,288 | 12/1947 | Danziger | 222/206 X |
| 3,325,031 | 6/1967 | Singier | 222/215 X |
| 3,325,860 | 6/1967 | Hansen | 18/5 |
| 3,862,684 | 1/1975 | Schmitt | 206/277 |
| 3,908,654 | 9/1975 | Lhoest et al. | 222/206 X |
| 3,993,223 | 11/1976 | Welker, III et al. | 222/107 |

FOREIGN PATENT DOCUMENTS

| | | | |
|---|---|---|---|
| 103686 | 2/1966 | Denmark . | |
| 2208704 | 9/1972 | Fed. Rep. of Germany . | |
| 3118580 | 6/1982 | Fed. Rep. of Germany . | |
| 334295 | 12/1903 | France | 222/206 |
| 475697 | 11/1952 | Italy | 222/206 |

Primary Examiner—Michael S. Huppert
Attorney, Agent, or Firm—Brumbaugh, Graves, Donohue & Raymond

[57] ABSTRACT

A dosage package of a thermoplastic material with a relatively flat container (1), which has a permanently shaped edge wall portion (5) extending all around, as well as two opposite side wall portions (8,9), which are compressable to discharge a well defined dosage via a discharge tube (), which is connected to the edge wall portion (5).

9 Claims, 1 Drawing Sheet

DOSAGE PACKAGE

BACKGROUND OF THE INVENTION

The invention relates to a dosage package for storing and/or dose discharge of a liquid, semi-liquid or pasty product, e.g. a medicament, food-stuff, cosmetic or an additive, which is to be added in a well defined amount.

The dosage package comprises a container of a thermoplastic material, which container is dimensioned and shaped for discharge of a specific dosage via a discharge portion by squeezing the container.

Dosage packages are known e.g. from U.S. Pat. No. 3,993,223, wherein a container which is elongated and tubular with a flattened cylindrical middle portion, is described. The package is substantially elliptical in cross-section and connected at the top to a truncated conical portion (having a discharge opening) and at the bottom to a hemispherical end portion. A planar holding tab is connected to the end portion, which tab is in co-operation with a tab on a break off sealing portion facilities the opening of the container.

In this known dosage package discharge is achieved by manual squeezing of the middle portion of the container, whereby the whole container is being deformed. By compressive forces of different strength the desired dosage can be discharged, and the remaining liquid quantity can be read on a scale on the container. Thus, the container construction as such will not discharge a well defined dosage, but rather the quantity discharged must be completely mastered by the user by adjustment of the compressive force.

W. German DE No. 3,118,580 describes a dosage package for an ointment or other similar product. Usually the package contains one dosage of the ointment. By compressing the whole package all the contents are squeezed out. Also Denmark No. DE 3,118,580 describes a dosage package which is squeezed together at use. The dosage packages described in the two last mentioned documents will only discharge a well defined dosage when all the contents of the package are squeezed out. It is not possible to discharge a specific dosage by squeezing the container once. Furthermore none of the dosage packages has the special form of the walls claimed in this application. The specific form of the walls of the claimed dosage package makes squeezing possible despite the great wall thickness.

SUMMARY OF THE INVENTION

One object of the invention is thus that squeezing can be performed conveniently despite the relatively great wall thickness of the container, so that the dosage package can also be used for products demanding high diffusion tightness and accordingly relatively thick container walls.

Another object is to achieve a dosage package, which by the construction of the container ensures a well defined dosage.

Yet another object is to achieve a dosage package, the form of which facilitates the opening of the container by breaking off a sealing part as well as a dosed discharge by squeezing.

These objects are achieved in a dosage package according to the invention in that the container is relatively flat with an all around extending, permanently shaped edge wall portion, to which the discharge portion is joined, as well as two opposite side wall portions at least one of which comprises an outwardly curved portion, which is compressable in order to discharge a well defined dosage. Thus, the edge wall portions and discharge portions of the container will retain their geometrical shape when squeezed, and merely the curved portion of the respective side wall portions will be deformed. By this the decrease in volume caused by the compression gives a dosage quantity which is well defined. The curved portion, when compressed, will pass an intermediate position having a complicated, wavy shape and then be bent inwards to an inwardly curved shape, approximately corresponding to the outwardly curved original position, while the other container portions remain intact. The curvature of the curved portion, however, should not be too great, as the deformation then is rendered more difficult through the shell effect.

Preferably the container is substantially symmetrical relative to a central plane between the opposite side wall portions, which thus each has an outwardly curved portion. A holding tab on a break off sealing part can be oriented parallelly to said central plane. The latter arrangement brings about that the container can be opened in a very convenient manner, the flat container being held in one hand and the holding tab in the other and is twisted in order to break off the sealing part from the discharge portion.

Further preferred features and advantages of the invention appear from the claims and from the detailed description below.

BRIEF DESCRIPTION OF THE DRAWING

Thus, the invention is to be explained ore in detail below, reference being made to the attached drawing, which illustrates a preferred embodiment of the dosage package according to the invention.

DESCRIPTION OF THE PREFERRED EMBODIMENT

Figure 1:
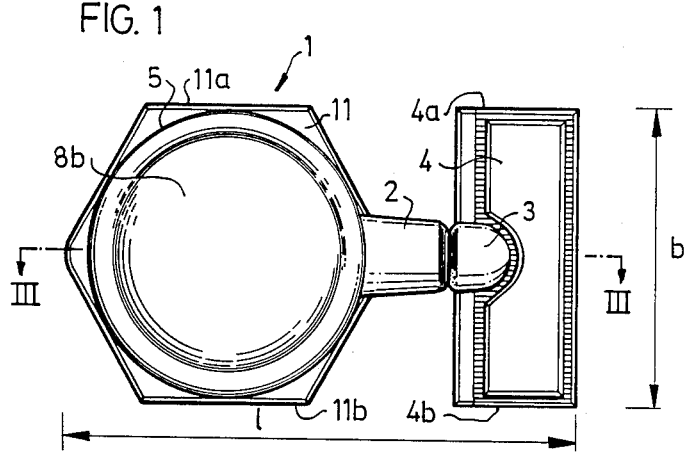
FIG. 1 is a top view of a dosage package according to the invention.

The dosage package shown on the drawing substantially consists of a relatively flat container 1 having a conical tubular discharge portion 2, the outer end of which is sealed by means of a break off sealing part 3 provided with a plain holding tab 4.

Figure 2:
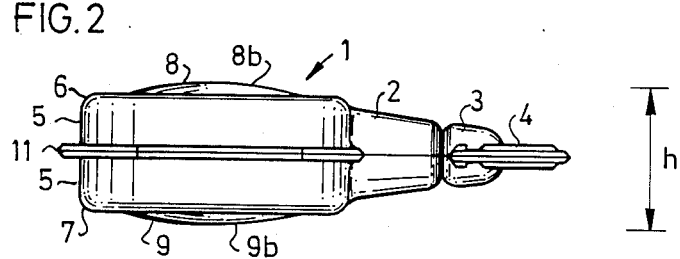
FIG. 2 is a side view of the dosage package of FIG. 1.
Figure 3:
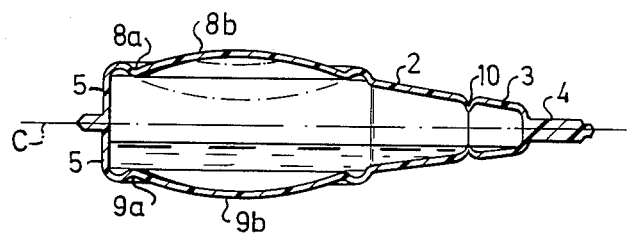
FIG. 3 is a central longitudinal section along the line III—III of FIG. 1.

The container is symmetrical in relation to two longitudinal planes, that is central planes parallel to each drawing plane, in FIGS. 1 and 2, respectively, and is, in this example, manufactured according to the so called bottle-pack technique (see U.S. Pat. No. 3,325,860). The container is moulded in two tool halves. The central plane C in FIG. 3 is located between these halves. According to the example described the container contains an inhalation liquid for treatment of pulmonary diseases. The active substances in these preparations are often sensitive to oxidation and it is therefore important to decrease the penetration of oxygen gas through the container wall from the outside by diffusion. It is also important that the contents of the container do not diffuse out, as this will result in a change in the concentration.

Glass might have been a suitable material, as it is practically diffusion tight, but plastic is preferred partly because it can be broken off without leaving any sharp, hard portions which may cause cuts, partly because it is deformable to a considerable extent, whereby discharge by squeezing is made possible. However, for the plastic materials being eligible, namely polyethylene, polypropylene or polyester, which do not react with the product, the thickness of the material must be relatively great in order to decrease the diffusion of oxygen gas to the inside of the container and loss of liquid through the container wall. Thus, in the present case, the wall thickness must be approximately 0.8 mm in order to achieve a satisfactory tightness of the package to prevent fluid diffusion.

With such a great wall thickness and attending stiffness of the walls, the container must be formed in a specific way in order to make possible a convenient squeezing for a dosed discharge of the contents. For example the container of U.S. Pat. No. 3,993,223 mentioned in the beginning would hardly be able to be squeezed if it had a wall thickness as great as 0.8 mm.

In one embodiment of the invention the container 1 is relatively flat, i.e. the vertical extension (distance h=14 mm in FIG. 2) is considerably less than the width (b=28 mm, FIG. 1) and the length (l=49 mm, FIG. 1). The container has an all around, along a circular outline, extending edge wall portion 5, which is circularly cylindrical and via an intermediate portion having a small radius of curvature 6 and 7, respectively, continues into an upper side wall portion 8 and an opposite, lower side wall portion 9, respectively. The upper side wall portion 8 comprises a substantially planar or inwardly bulged annular portion 8a (FIG. 3) as well as a central, relatively great, outwardly (upwardly) slightly curved portion 8b, and in a corresponding way the lower side wall portion 9 comprises an annular portion 9a and an outwardly (downwardly) curved portion 9b.

While the circularly cylindrical edge wall portion 5 and the thereto connected truncated conical discharge portion 2 are extremely shape permanent as a consequence of their geometrical configuration, the slightly curved portions 8b and 9b can easily be deformed by squeezing by means of two or more fingers (the thumb on one side and e.g. the fore finger on the opposite side). Each respective portion 8b, 9b will then pass a wavy central position (the shorter dashed-dotted line in FIG. 3) and finally be transformed into a completely depressed, inwardly curved final position (the longer dashed-dotted line in FIG. 3). By this the container volume is decreased with a well defined volume part corresponding to the desired dosage. If desired, the container can contain a volume of the product referred to being sufficient for two or more dosages. By squeezing the opposite curved portions 8b, 9b once a well defined dosage is thus obtained (after the breaking off of the sealing part 3).

In the example shown the container volume is about 5 ml. The wanted dosage is 2 ml, which is obtained when the opposite curved portions are completely compressed (which does not require a particularly great force). The container can be filled with 2 ml, i.e. corresponding to one dosage, or 4 ml, i.e. corresponding to two dosages.

It is apparent from the cross-section according to FIG. 3 that the container has mainly the same wall thickness (about 0.8 mm) all over. In the transitional zone 10 between the discharge portion 2 and the sealing part 3 the wall thickness is reduced, implying a weakening, which is used when breaking off the sealing part 3. The latter can be particularly conveniently performed in holding the flat container 1 in one hand, while the holding tab 4 is held in the other hand and a twisting motion is made until the material breaks while being sheared in the transitional zone 10.

It is further apparent from FIG. 1 that a flange 11 is formed in one piece with the container 1. The flange 11 is plain and is located in the central plane C (in FIG. 3) and has a polygonal, in the shown example, hexagonal outline. The flange 11 renders a certain stiffness to the edge wall portion 5, but its main purpose is to enable a joining of several packages of the same kind in connection with the manufacturing. As is previously known the different containers are oriented next to each other with the opposite flange edges 11a and 11b connected to the corresponding flange edges of the adjacent containers via weak material bridges. The opposite edges 4a and 4b of the holding tabs 4 are also connected to the holding tabs of the adjacent containers.

The package can be modified in various ways by a person skilled in the art within the scope of the claims. In principal only one side wall 8 or 9 needs to have an outwardly curved portion, while the other may be substantially planar and relatively shape permanent. Furthermore, the edge wall portion of the container can have a polygonal outline and the curved portion 8b and 9b, respectively, can also have a non-circular periphery, e.g. elliptical or polygonal. The curved portion can be either single curved or double curved. However, the curvature must not be so great that the deformation when squeezing is made too difficult. Furthermore, the container can be designed without a flange. Other methods than the bottle-pack can in addition be used for the forming of the container. The container is for example manufactured by conventional injection moulding, whereafter the filling of the product takes place separately and is followed by a sealing of the container.

Finally, the container can have lesser or greater dimensions than in the example shown and can, e.g., hold several dosages. The extent of filling can vary and also other products than medicaments of different kinds, for example foodstuff, cosmetics, skin care articles, setting agents for resins, additives for laboratory use, and so on, can be packed in this way.

I claim:

1. A dosage package for storing and discharging a liquid, semi-liquid or pasty product, comprising a squeezing thermoplastic container portion and a discharge portion, said container portion and discharge portion being parts of a unitary member, said container portion having a closed all around extending circular cylindrical shaped substantially rigid edge wall portion to which said discharge portion is joined, two opposite side wall portions, at least one of which includes an outwardly durved portion which is compressible to an inwardly similarly curved position so as to measure and discharge a specific dosage when the outwardly curved portion is compressed to the inwardly curved position, and an annular bulged portion forming a juncture between the edge wall portion and the outwardly curved portion so as to form and to limit the outwardly curved portion and also limit the inwardly curved position of the outwardly curved portion, said edge wall portion and said side wall portions having a substantially equal thickness, said thickness being sufficient so that substantially no fluid is diffusable through said wall portions, and so that the side wall portions are imcompressible without said annular bulged portion and said discharge portion being configured so as to prevent discharge of the product stored in the container in the absence of compression of said outwardly curved portion to the inwardly curved position.

2. A dosage package according to claim 1, characterized in that the container is substantially symmetrical relative to a central plane between the opposite side wall portions.

3. A dosage package according to claim 1, characterized in that said discharge portion is provided with a break off sealing part having a holding tab parallel to said central plane.

4. A dosage package according to claim 1, characterized in that said curved portion has the shape of a cap.

5. A dosage package according to claim 1, wherein said edge wall portion is substantially cylindrical.

6. A dosage package according to claim 1, wherein said container is made of a material of the group consisting of polyethylene, polypropylene and polyester, and has a wall thickness in the range of 0.3–1.5 mm.

7. A dosage package according to claim 6, wherein said container is made of one of the group consisting of polyethylene, polypropylene and polyester, said container having a wall thickness in the range of 0.6–1.0 mm.

8. A dosage package according to claim 7, wherein said container is made of one of the group consisting of polyethylene, polypropylene, and polyester, said container having a wall thickness of 0.8 mm.

9. Method of making dosing possible from a container having such a great wall thickness that said container normally cannot be compressed characterized in that the walls of the container are formed in such a way that the said container is relatively flat with a closed all around extending circular cylindrical shaped substantially rigid edge wall portion, in that the said edge wall portion via an annular bulged portion continues into an annular portion to which an outwardly curved side wall portion is joined, said annular portion forming and limiting the outwardly curved side wall portion and also limiting the side wall portion to an inwardly similarly curved position when the outwardly curved portion is compressed to discharge a defined dose from the container and in that a discharge portion of the container is configured so as to prevent discharge of the product from the container in the absence of compression of said side wall portion to said inwardly curved position.

* * * * *